(12) United States Patent
Ravichandran et al.

(10) Patent No.: US 10,778,806 B2
(45) Date of Patent: Sep. 15, 2020

(54) SHARD SANDBOXING

(71) Applicant: Facebook, Inc., Menlo Park, CA (US)

(72) Inventors: Kaushik Ravichandran, Seattle, WA (US); Maxwell T. Sayles, Seattle, WA (US); Muthukaruppan Annamalai, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 185 days.

(21) Appl. No.: 15/729,476

(22) Filed: Oct. 10, 2017

(65) Prior Publication Data

US 2019/0109922 A1    Apr. 11, 2019

(51) Int. Cl.
*H04L 29/08* (2006.01)
*H04L 12/26* (2006.01)
*G06F 9/50* (2006.01)

(52) U.S. Cl.
CPC ............ *H04L 67/32* (2013.01); *G06F 9/5083* (2013.01); *H04L 43/0817* (2013.01); *H04L 43/16* (2013.01); *G06F 2209/508* (2013.01); *G06F 2209/5014* (2013.01)

(58) Field of Classification Search
CPC ....................................................... H04L 67/32
See application file for complete search history.

(56) References Cited

U.S. PATENT DOCUMENTS

2017/0257303 A1* 9/2017 Boyapalle ............... H04L 67/34
2018/0060400 A1* 3/2018 Wu ........................ G06F 9/5022

\* cited by examiner

*Primary Examiner* — Adnan M Mirza
(74) *Attorney, Agent, or Firm* — FisherBroyles, LLP (57) ABSTRACT

The disclosure is directed to sandboxing data shards in a host server. A shard can store a subset of data associated with an application, and provide read and/or write services to various application services. In a multi-tenant architecture, different application services can share common hardware of a multi-tenant system to improve hardware utilization and efficiency. For example, shards associated with various application services are hosted by a common host server. Accessing of a shard, e.g., by an application service, consumes resources of the host server. A bug or a spike in the usage of the host server by one application service can impact other application services with which the host server is shared. To reduce or eliminate this problem, the shards will be sandboxed in the host server, which can include reserving resources, e.g., computing, networking and/or storage resources, for each of the shards.

20 Claims, 9 Drawing Sheets

SHARD SANDBOXING

BACKGROUND

In a multi-tenant system, applications of different customers share the common hardware. Ensuring proper resource allocation for each of the customers in a multi-tenant system is a challenge. Typically, limits are set to a customer's resource utilization and load balancing is performed by balancing a resource's use across the applications, e.g., storage resource or computing resource. For example, a first customer can be allocated a first amount of storage on the multi-tenant system and a second customer can be allocated a second amount of the storage space. However, there are several drawbacks with this approach.

First, such load balancing techniques may require constant fine tuning of resource limits for the customer, e.g., if customer's resource usage increases over a period, which can be cumbersome for database administrators. Second, it is possible for the multi-tenant system to be overwhelmed by the applications hosted by it. Third, it may be difficult to guarantee resources for a given use case/customer. Fourth, it may be difficult to deal with surges in traffic, e.g., spikes in resource consumption. Finally, if every customer has stringent throttling limits, it may be difficult to make effective use of the hardware resources, as it is possible that the requests are being throttled while hardware resources are still being available.

DETAILED DESCRIPTION

Embodiments are directed to sandboxing data shards in a host server computer ("host server"). A data shard ("shard") can store a subset of data associated with an application, e.g., a social networking application, and provide read and/or write services to various services of the application ("application"). Different application services can read and/or write data to and/or from different shards. In a multi-tenant architecture, different application services can share common hardware of a multi-tenant system to improve hardware utilization and efficiency. For example, shards associated with various application services are hosted by a common host server. Accessing of a shard, e.g., by an application service, consumes resources of the host server. A bug or a spike in the usage of the host server by one application service can impact other application services with which the host server is shared. To reduce or eliminate this problem, the shards will be sandboxed in the host server. In some embodiments, sandboxing can include reserving resources, e.g., computing, networking and/or storage resources, for each of the shards.

The shards can be sandboxed in the host server using throttling and load balancing techniques. Application services can specify an expected resource utilization, e.g., per shard. A load balancing server computer ("load balancing server") can allocate a buffer to this expected resource utilization and either prevent additional utilization over the allocated buffer (e.g., because other co-tenants are also using the hardware) or tolerate temporary spikes in utilization, as appropriate. In some embodiments, the load balancing server tolerates temporary spikes in utilization of the host server by a specified shard if it does not impact utilization of the host server by other shards, e.g., associated with other application services, hosted in the host server. In some embodiments, the load balancing server can prevent additional utilization of the host server over the allocated buffer by a specified shard if it impacts utilization of the host server by other shards hosted in the host server.

The load balancing server can prevent additional resource utilization by setting a throttling limit for a specified shard and throttling access requests for the specified shard, e.g., failing or rejecting the access requests, in an event serving the access requests results in exceeding the throttling limit. In some embodiments, the throttling limit is maximum allowed resource utilization for the specified shard, e.g., maximum amount of a specified resource that can be consumed by the specified shard. The throttling limit can be set for various resource utilizations by the specified shard, e.g., storage resource utilization, network resource utilization, and/or computing resource utilization. The throttling limits can be different for different resource utilizations of the specified shard, and can further be different for different shards to be hosted by the host server.

The load balancing server can determine the throttling limit in various ways. In some embodiments, the load balancing server determines a throttling limit for a specified shard for a specified resource based on actual utilization or consumption of the specified resource. For example, if the actual utilization of storage by the specified shard is 5 GB, then the load balancing server can allocate a buffer to the actual consumption, e.g., a specified percentage of the actual consumption, such as 25% of 5 GB, which is 1.25 GB, and determine the throttling limit for the storage consumption based on the buffer, which is 6.25 GB. The load balancing server can throttle any write requests to the specified shard in an event the size of the shard exceeds 6.25 GB on the host server. Further, in some embodiments, the load balancing server can continuously monitor the actual consumption for a specified period and can adjust the throttling limit as the actual consumption varies. For example, the load balancing server can adjust the throttling limit every day based on the actual consumption of the resource over the last 30 days.

In some embodiments, the load balancing server can set throttling limits based on resource reservation requirements published by the application services. The application services can publish a minimum amount of resource utilization per shard in which case the load balancing server ensures that a throttling limit is not set below the minimum amount. For example, if an application service has specified the minimum amount of storage required per shard is 10 GB, then the load balancing server ensures that the throttling limit is not set below 10 GB per shard.

In some embodiments, the load balancing server can determine a number of shards to be hosted at the host server based on a set of throttling limits associated with each of the shards and a set of constraints associated with the host server. For example, the constraints can indicate that the host server can provision up to 1 TB of storage space, process up to "1000" queries per second (QPS), host up to "200" shards and provide "70%" CPU utilization. The set of throttling limits can indicate that throttling limits for some shards as 5 GB storage size, "20" read QPS, "2" write QPS, "0.5%" CPU utilization; and for some other shards as 10 GB storage size, "80" read QPS, "5" write QPS, "0.75%" CPU utilization, and so on. The load balancing server can determine the number of shards to be hosted by the host server based on the constraints and the published throttling limits, such that the resources of host server are utilized efficiently between the various shards of various application services.

In some embodiments, the load balancing server can implement a soft throttling approach. In the soft throttling approach, when the utilization of a specified resource by a specified shard reaches the throttling limit but is still below the constraint of the host server, the load balancing server does not throttle access requests for the specified shard, instead may notify the application service associated with the specified shard regarding the throttling limit being reached. The load balancing server may not throttle the access requests yet because the resource consumption by the specified shard does not impact the resource availability for other shards. The load balancing server may start throttling the access requests if the constraints of the host server are breached.

In some embodiments, by sandboxing the shards in the host server, setting throttling limits for resource utilization, and adjusting the throttling limits, the load balancing server can reserve resources for various application services and reduce or eliminate the problem of resource utilization of one tenant impacting that of other tenants in a multi-tenant system.

Figure 1:
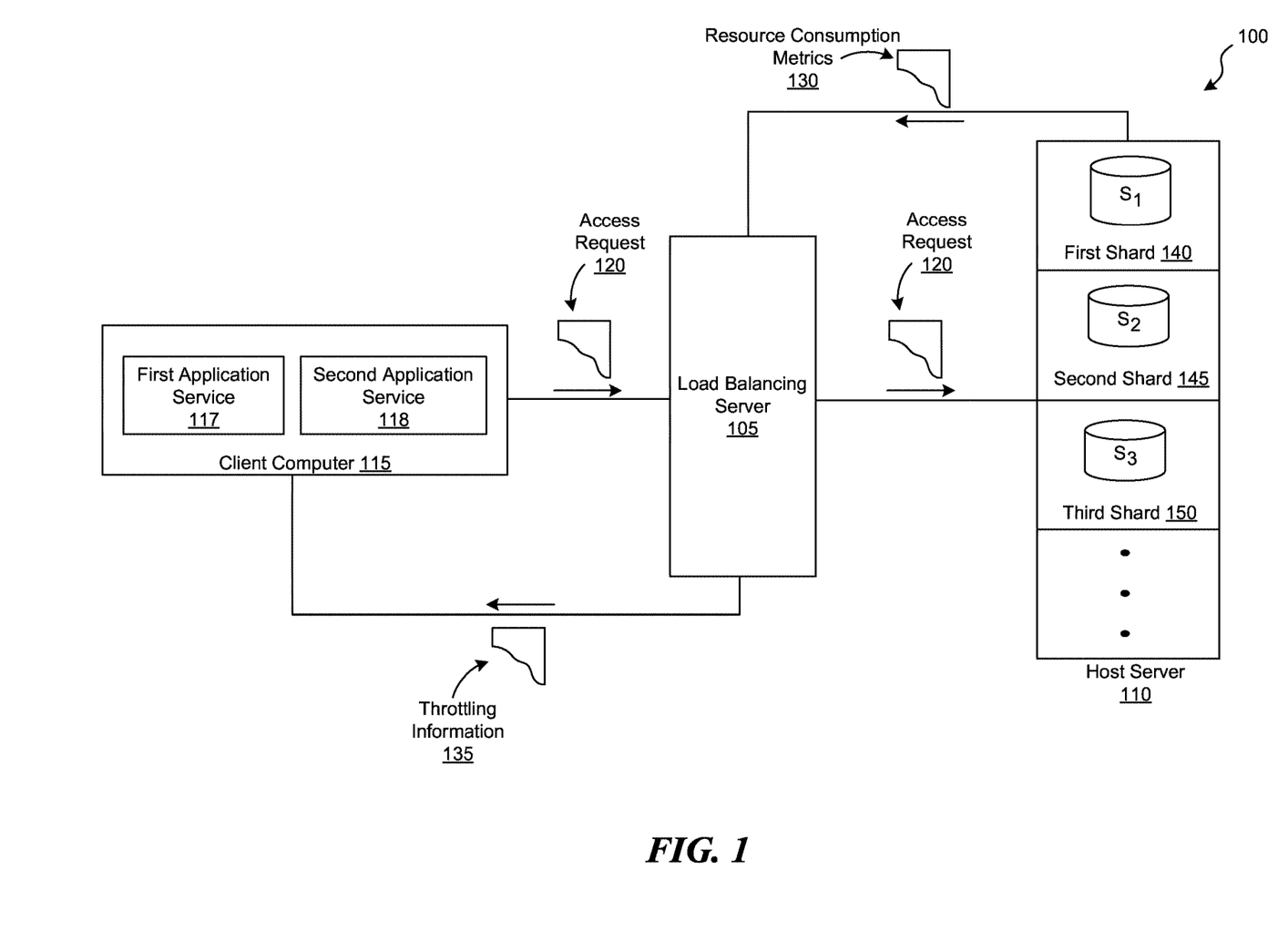
FIG. 1 is a block diagram illustrating an environment in which the disclosed embodiments can be implemented.

Turning now to figures, FIG. 1 is a block diagram illustrating an environment 100 in which the disclosed embodiments can be implemented. The environment 100 includes a load balancing server 105 that manages sandboxing shards associated with various tenants, e.g., application services, into a multi-tenant system, e.g., a host server 110. The application services, e.g., a first application service 117 and a second application service 118, can be different services of an application, such as a messenger service, a photo uploading service, a gaming service or an ad service of a social networking application. An application service can be associated with one or more shards. For example, a first shard 140 and a second shard 145 can be associated with the first application service 117 and a third shard 150 can be associated with the second application service 118. Each of the shards can store a subset of the data associated with the corresponding application service. By having the shards sandboxed in the host server 110, the application services share the resources, e.g., storage, computing and/or network resources, of the host server 110.

The host server 110 has a finite amount of resources, which can be expressed as constraints of the host server 110. For example, the constraints can indicate that the host server 110 can process a maximum of 20K QPS (e.g., read and/or write), provision 70% CPU to serving the access requests for the shards, has a maximum of 1.5 TB storage space and can host a maximum of "200" shards. The resources of the host server 110 are shared across the shards of different application services. When an access request 120 is received for a particular shard, e.g., the first shard 140, the host server 110 processes the access request 120, e.g., reads data from or writes data to the first shard 140, and returns the result to the application service that issued the access request 120. The result can be returned to the application service directly or through the load balancing server 105. In processing the access request, the first shard 140 utilizes a specified amount of one or more resources of the host server 110. In some embodiments, if the resource utilization by the shards exceeds the constraints of the host server 110, the host server 110 is overloaded and the efficiency and/or response time of the host server 110, and therefore, that of the one or more of the application services, can decrease as the latency in serving a particular access request increases. In some embodiments, even if the constraints are not exceed but if resource utilization of a particular shard exceeds the allotted resource or the expected resource utilization of the particular shard, it can impact the availability of resources for other shards hosted on the host server 110, which can decrease the efficiency of the corresponding application services. That is, an imbalance in the resource utilization by one or more shards in the host server 110 can impact the other shards hosted in the host server 110.

To reduce or eliminate this problem of imbalance in the resource utilization, the load balancing server 105 can sandbox the shards in the host server 110, which can include reserving resources, e.g., computing, networking and/or storage resources, for each of the shards. The load balancing server 105 can be sandbox the shards in the host server 110 using throttling and load balancing techniques. Application services can specify an expected resource utilization, e.g., per shard. The load balancing server 105 can allocate a buffer to this expected resource utilization and either prevent additional utilization over the allocated buffer (e.g., because other co-tenants are also using the hardware) or tolerate temporary spikes in utilization, as appropriate. The load balancing server 105 can prevent additional resource utilization by a specified shard by setting a throttling limit 125 for the specified shard, and throttling access requests for the specified shard, e.g., failing or rejecting the access requests, in an event serving one or more those access requests results in exceeding the throttling limit 125. The throttling limit 125 can be set for various resource utilizations, e.g., storage resource utilization, network resource utilization, and/or computing resource utilization.

The load balancing server 105 can determine the throttling limit 125 in various ways. In some embodiments, the load balancing server 105 determines the throttling limit 125 for a specified shard for a specified resource based on an actual utilization or consumption of the specified resource. For example, the load balancing server 105 can determine the actual consumption of the specified resource by the specified shard, allocate a buffer to the actual consumption (e.g., for tolerating spikes or temporary increases in the consumption), and determine the throttling limit based on the buffer and the actual consumption. The load balancing server 105 can throttle any access requests to the specified shard in an event serving the access requests results in exceeding the throttling limit 125. The load balancing server 105 can monitor the host server 110 and generate and/or retrieve resource consumption metrics 130, which can be used to derive actual resource consumption of various resources by each of the shards.

In some embodiments, the load balancing server 105 can set throttling limits based on resource reservation requirements published by the application services. The application services can publish a minimum amount of resource utilization per shard in which case the load balancing server 105 ensures that a throttling limit is not set below the minimum amount.

In some embodiments, the load balancing server 105 can determine a number of shards to be hosted at the host server 110 based on a set of throttling limits associated with the shards and a set of constraints associated with the host server 110. The load balancing server 105 can keeping adding shards to the host server 110 until the constraints are met.

In some embodiments, the load balancing server 105 can implement a soft throttling approach in which the load balancing server 105 does not throttle the access requests for the specified shard if the throttling limits are breached, instead it may notify the application service associated with the specified shard regarding the throttling limit being reached or breached. The load balancing server 105 may start throttling the access requests if and when the constraints of the host server 110 are breached.

The application services execute on a client computer 115. A client computer 115 can execute more than one application service or the application services can be distributed across multiple client computers.

The load balancing server 105 receives an access request from the first application service 117 to access the first shard 140. The load balancing server 105 determines whether the execution of the access request 120 by the host server 110 can cause the resource utilization of the first shard 140 to exceed a throttling limit 125 for the corresponding resource. If the load balancing server 105 determines that the resource utilization can exceed the throttling limit 125, the load balancing server 105 can throttle the access request 120. For example, if the QPS of the first shard 140 is "20" and executing the access request 120 can cause the QPS of the first shard 140 to increase to "21," then the throttling limit 125 for the QPS is violated, and therefore, the load balancing server 105 can throttle, e.g., reject or fail, the access request 120. The throttled access request is not transmitted to the host server 110. In some embodiments, the load balancing server 105 may continue to transmit the access request 120 to the host server 110, regardless of whether the throttling limit 125 is exceeded, for execution if the constraints of the host server 110 are not breached. The load balancing server 105 can feed throttling information 135 back to the client computer 115. The throttling information 135 can be indicative of at least one of whether a particular access request is throttled or not, how many access requests are throttled, or how many access requests are transmitted to the host server 110. In some embodiments, the client computer 115 uses the throttling information 135 to adjust the number of access requests sent to the load balancing server 105 from an application service, such that the number of access requests throttled by the load balancing server 105 is reduced.

Additional details with respect to setting the throttling limits and throttling the access requests are described at least with reference to FIGS. 3-7.

Figure 2:
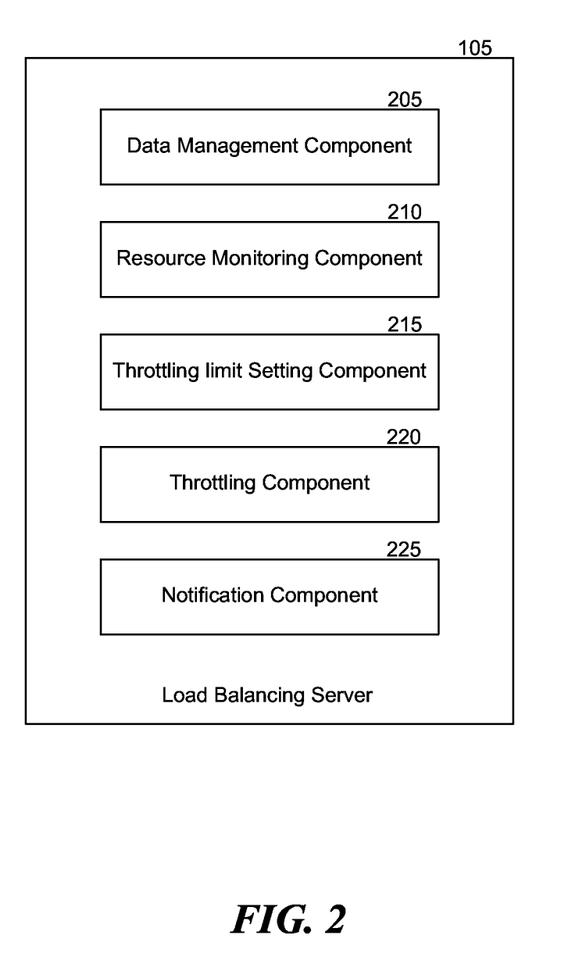
FIG. 2 is a block diagram of a load balancing server of FIG. 1, consistent with various embodiments.

FIG. 2 is a block diagram of the load balancing server of FIG. 1, consistent with various embodiments. The load balancing server 105 includes a data management component 205 that can receive access requests from the application services and transmit them to the host server 110.

The load balancing server 105 includes a resource monitoring component 210 that can monitor the resource utilization by the shards. The resource monitoring component 210 can retrieve the resource consumption metrics 130 from the host server 110, which is indicative of the actual consumption of the resources by one or more of the shards hosted by the host server 110.

The load balancing server 105 includes a throttling limit setting component 215 that can be used to determine and set throttling limits for a specified shard for various resources.

The load balancing server 105 includes a throttling component 220 that can be used to throttle access requests for a specified shard. For example, the throttling component 220 can throttle access requests for the specified shard in an event the execution of the access requests is determined to cause the resource utilization by the specified shard to exceed one or more throttling limits set for the specified shard.

The load balancing server 105 includes a notification component 225 that can be used to notify an entity associated with an application service or a specified shard in an event the access requests for the specified shard are throttled and/or if the resource utilization by the specified shard exceeds one or more throttling limits or is within a specified threshold from one or more throttling limits set for the specified shard.

Additional details with respect to the above components of the load balancing server 105 are described at least with reference to FIG. 3-7 below. Note that the load balancing server 105 illustrated in FIG. 2 includes five modules. However, the number of components in the load balancing server 105 is not restricted to the above components. The load balancing server 105 can include lesser number of components, e.g., functionalities of two components can be combined into one component, or can include more number of components, e.g., additional components that perform other functionalities. Further, the above components can be implemented in a single machine or distributed across machines.

Figure 3:
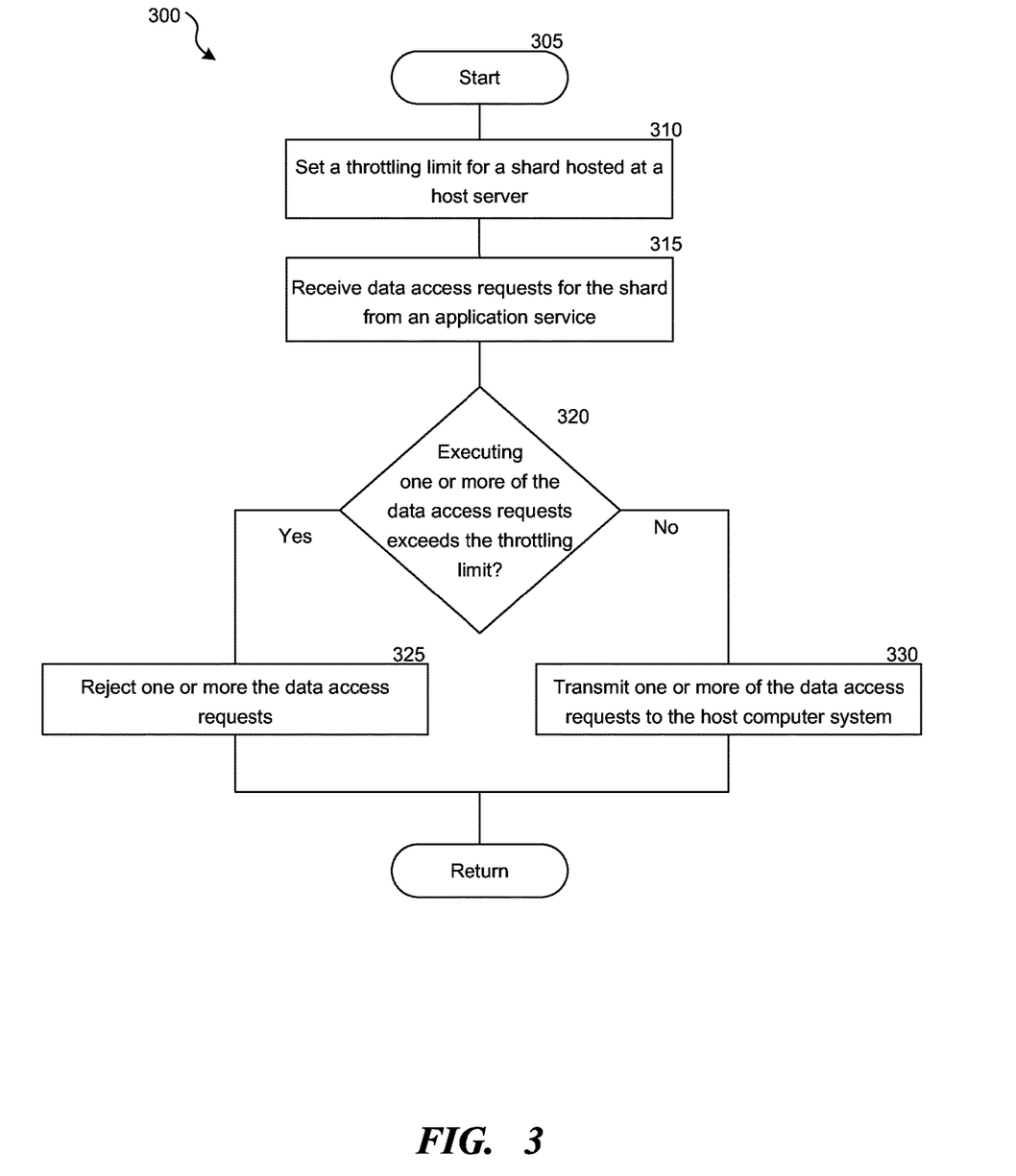
FIG. 3 is a flow diagram of a process for processing access requests for shards sandboxed in a host server, consistent with various embodiments.

FIG. 3 is a flow diagram of a process 300 for processing access requests for shards sandboxed in a host server, consistent with various embodiments. The process 300 may be executed in the environment 100 of FIG. 1. The process 300 begins at block 305, and at block 310, the throttling limit setting component 215 sets a throttling limit for a specified shard hosted at the host server 110. The throttling limit can be set with respect to one or more resource utilizations of the specified shard. For example, the throttling limit setting component 215 can set throttling limits for storage resource utilization, network resource utilization, and/or computing resource utilization of the first shard 140. The throttling limit for the storage utilization can be, for example, 5 GB, which indicates that the first shard size cannot exceed 5 GB in the host server 110. Similarly, the throttling limit for the computing resource utilization can be, for example, "20" read QPS and "2" write QPS, which indicates that the number of read QPS for the first shard 140 cannot exceed "20" and the write QPS cannot exceed "2." Similarly, another throttling limit for the computing resource utilization can be, for example, "0.5%" CPU utilization, which indicates that the CPU resource utilization of the first shard 140 cannot exceed "0.5%" CPU of the host server 110. The throttling limit setting component 215 can set throttling limits for one or more resource utilizations and for one or more of the shards hosted by the host server 110. Examples of determining throttling limits are described at least with reference to FIGS. 4 and 5.

At block 315, the data management component 205 receives data access requests for a specified shard hosted at the host server 110. The data access requests can be issued by an application service, which reads and/or writes data to the specified shard. For example, the data access requests, such as access request 120, can be issued by the first application service 117 for accessing the first shard 140.

At block 320, the throttling component 220 determines if executing one or more of the data access requests exceeds throttling limit 125. For example, if the throttling limit with respect to QPS of the first shard 140 is "20" and executing the data access requests can cause the QPS of the first shard 140 to exceed "20," then the throttling limit 125 for the first shard 140 with respect to the QPS is violated.

Responsive to a determination that executing one or more of the data access requests exceeds the throttling limit, at block 325, the throttling component 220 can throttle, e.g., reject or fail, one or more of the data access requests. The throttled data access requests are not transmitted to the host server 110. On the other hand, responsive to a determination that executing one or more of the data access requests does not exceed the throttling limit, at block 330, the throttling component 220 transmits the data access requests to the host server 110.

Figure 4:
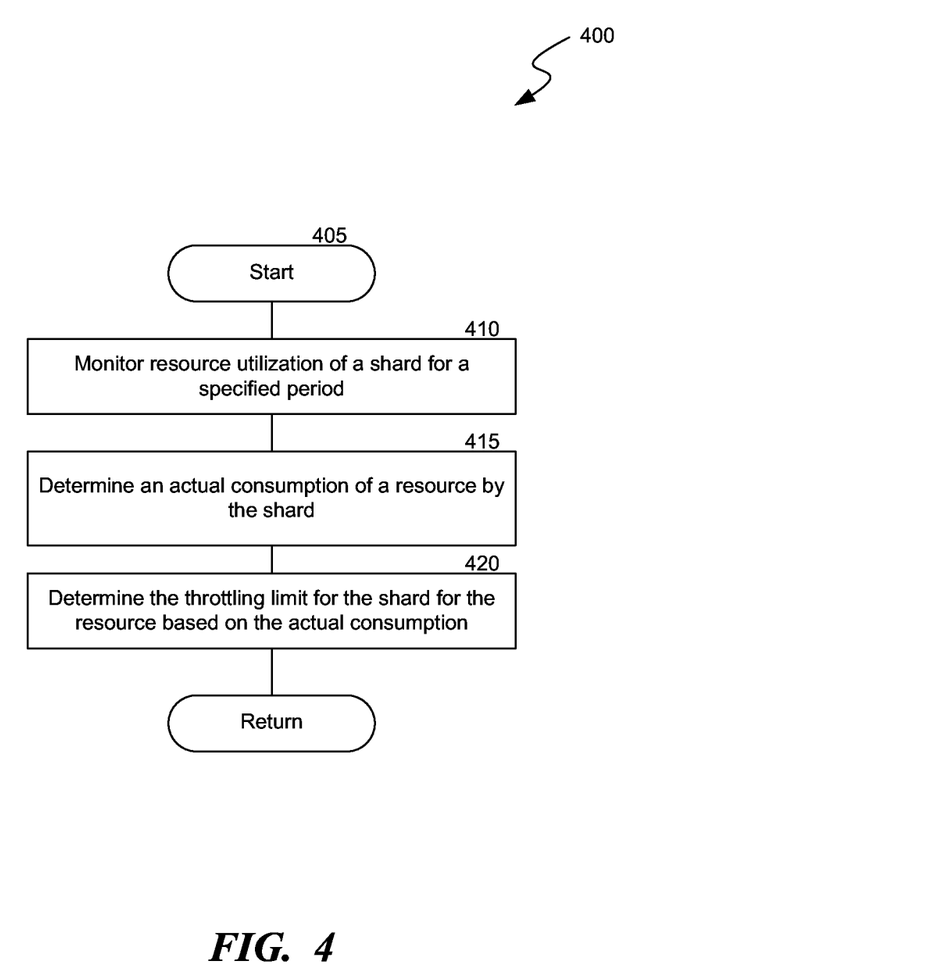
FIG. 4 is a flow diagram of a process for determining a throttling limit for a shard, consistent with various embodiments.

FIG. 4 is a flow diagram of a process 400 for determining a throttling limit for a shard, consistent with various embodiments. The process 400 may be executed in the environment 100 of FIG. 1, and in some embodiments, as part of block 310 of FIG. 3. The process 400 begins at block 405, and at block 410, the resource monitoring component 210 monitors the resource utilization of a specified shard in the host server 110 for a specified period. The resource monitoring component 210 can receive resource consumption metrics 130 from the host server 110, which includes information regarding actual consumption of various resources, such as storage resource utilization, network resource utilization, and/or computing resource utilization.

At block 415, the resource monitoring component 210 determines the actual consumption of the specified resource by the specified shard by analyzing the resource consumption metrics 130. For example, the resource monitoring component 210 analyzes the resource consumption metrics 130 to determine the actual storage consumption of the first shard 140 for a period of 30 days. The actual consumption can be determined in various ways. For example, the actual consumption can be the maximum storage consumed by the first shard 140 per day for the last 30 days, except for any anomalies in the consumption. In another example, the actual consumption can be the average storage consumed per day for the last 30 days. In some embodiments, the resource consumption metrics 130 may have actual resource consumption data for only a portion of the specified period and not the entire period. The resource monitoring component 210 can consider the actual consumption data for a subset of the specified period included in the resource metrics and extrapolate that data to the remaining of the specified period to get the actual consumption for the specified period. For example, the resource consumption metrics 130 can include actual resource consumption data for 4 days out of 30 days. The resource monitoring component 210 can use that data and extrapolate it to the remaining 26 days to get actual consumption data for 30 days.

In some embodiments, in analyzing the resource consumption metrics 130, the resource monitoring component 210 can exclude any anomalies such as any spikes or bursts of increase or decrease in consumption of the resource in the specified period. The resource consumption metrics 130 can determine the anomalies in various ways.

At block 420, the throttling limit setting component 215 determines the throttling limit for the specified shard with respect to one or more resource utilization based on the actual consumption, e.g., determined in block 415. In some embodiments, the resource monitoring component 210 allocates a buffer to the actual consumption, e.g., a specified percentage of the actual consumption, and determines the throttling limit based on the actual consumption and the buffer. For example, if the actual utilization of the storage resource by the specified shard is determined as 5 GB, then the resource monitoring component 210 can allocate a buffer to the actual consumption, such as 25%, which is 1.25 GB, and determine the throttling limit for the storage resource as 6.25 GB. The amount of buffer allocated can be configurable, e.g., by an entity associated with the host server 110 or the application service corresponding to the specified shard.

In some embodiments, the throttling limit can be adjusted, e.g., increased or decreased, based on a trigger. For example, the throttling limit can be adjusted at regular time intervals. In another example, the throttling limit can be adjusted when the actual consumption of a specified resource changes beyond a specified threshold.

Figure 5:
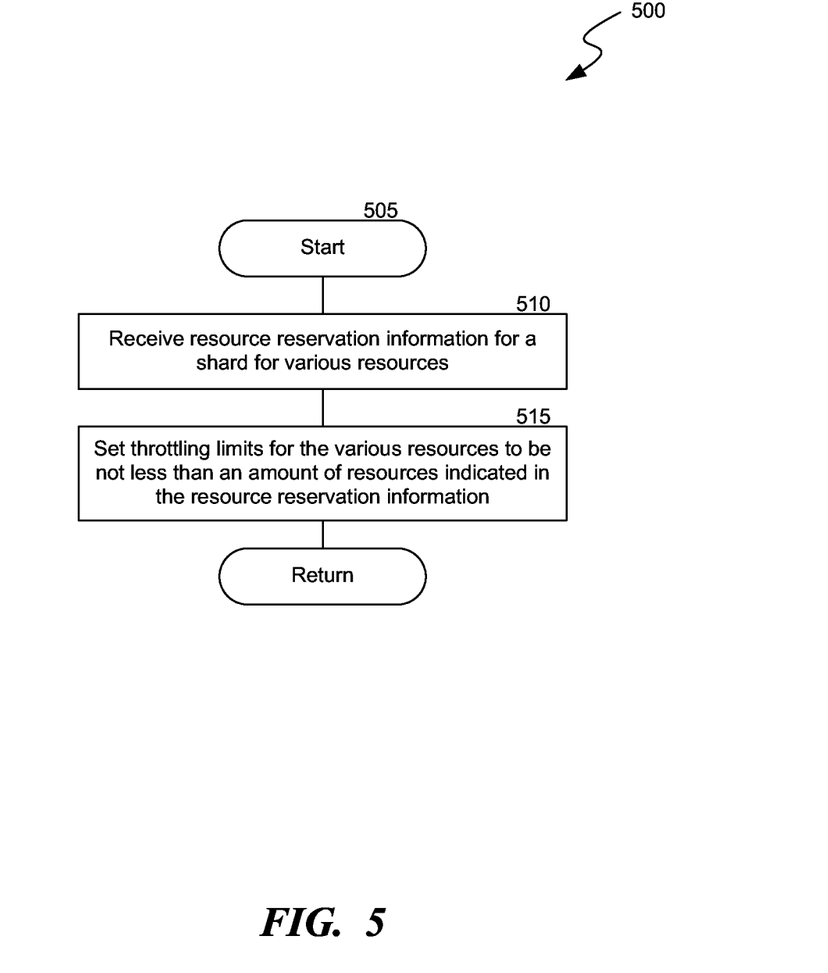
FIG. 5 is a flow diagram of a process for determining a throttling limit for a shard, consistent with various embodiments.

FIG. 5 is a flow diagram of a process 500 for determining a throttling limit for a shard, consistent with various embodiments. The process 500 may be executed in the environment 100 of FIG. 1, and in some embodiments, as part of block 310 of FIG. 3. The process 500 begins at block 505, and at block 510, the data management component 205 receives resource reservation information for a specified shard, e.g., published by an application service. The resource reservation information can be indicative of a minimum amount of resource to be allocated for the specified shard. For example, the resource reservation information can indicate that the application service has specified the minimum amount of storage resource to be allocated for the first shard 140 is 10 GB. The application service can publish such requirements for other resources as well.

At block 515, the throttling limit setting component 215 sets a throttling limit for the specified shard to be not less than the amount indicated in the resource reservation information. For example, if an application service has specified the minimum amount of storage required for the first shard 140 is 10 GB, then the throttling limit setting component 215 ensures that the throttling limit is not set below 10 GB for the first shard 140.

Figure 6:
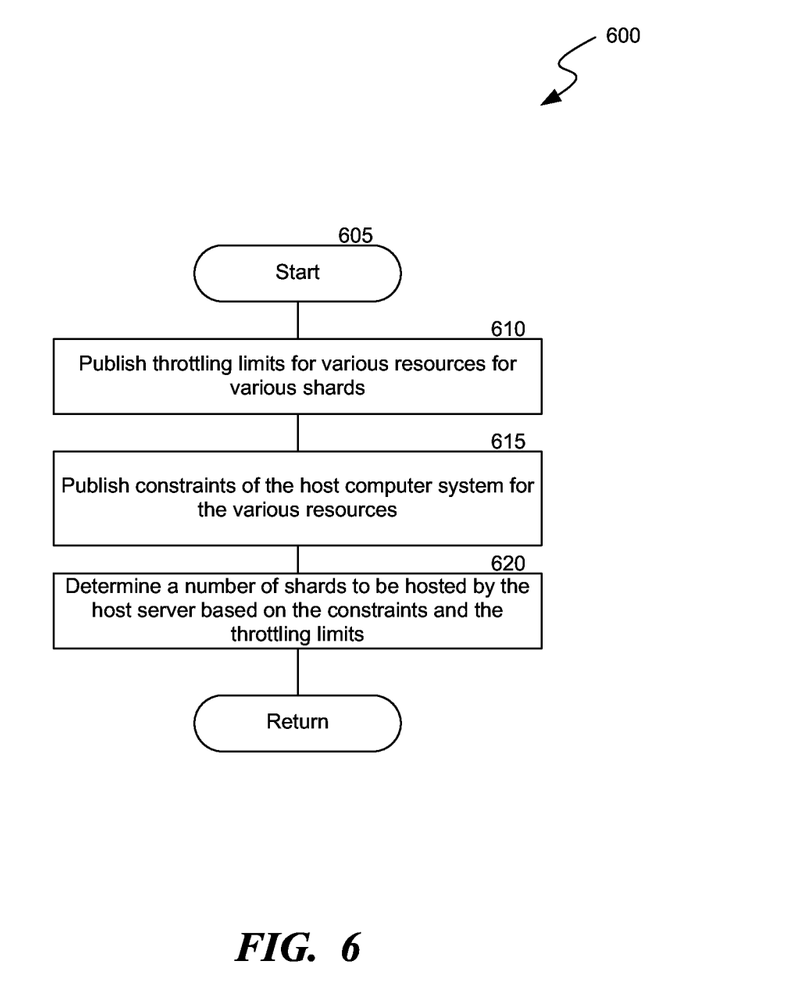
FIG. 6 is a flow diagram of a process for hosting shards on a host server of FIG. 1 based on a throttling limit of the shards, consistent with various embodiments.

FIG. 6 is a flow diagram of a process 600 for hosting shards on a host server based on a throttling limit of the shards, consistent with various embodiments. The process 600 may be executed in the environment 100 of FIG. 1. The process 600 begins at block 605, and at block 610, the data management component 205 receives throttling limits for multiple shards, e.g., published by an entity associated with an application service or the host server 110. The throttling limits can be with respect to various resource utilizations of a shard. The throttling limits for some shards can be 5 GB storage size, "20" read QPS, "2" write QPS, "0.5%" CPU utilization; and for some other shards can be 10 GB storage size, "80" read QPS, "5" write QPS, "0.75%" CPU utilization, and so on.

At block 615, the data management component 205 receives constraints associated with the host server 110, e.g., published by an entity associated with the host server 110. For example, the constraints can indicate that the host server 110 can provision up to 1 TB of storage space, process up to "1000" QPS, host up to "200" shards and provide "70%" CPU utilization.

At block 620, the throttling limit setting component 215 can determine the number of shards to be hosted by the host server 110 based on the constraints and the published throttling limits. For example, instead of throttling access requests when the throttling limits are breached, e.g., as described at least with reference to FIGS. 1 and 3, the throttling limit setting component 215 can keep "packing" shards onto the host server 110 until the constraints are met, e.g., by the throttling limits of the "packed" shards. In such embodiments, the host server 110 may balance the resources across the shards even without throttling requests as the shards are already allocated resources based on their throttling limits.

Figure 7:
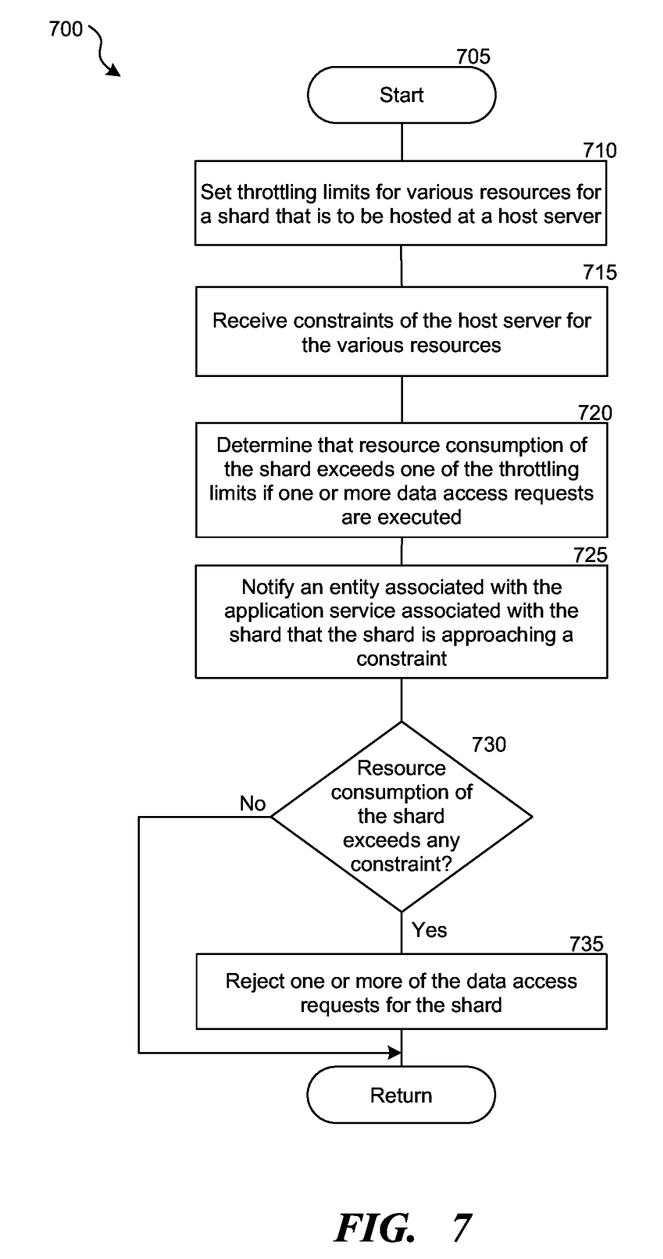
FIG. 7 is a flow diagram of a process for implementing soft throttling, consistent with various embodiments.

FIG. 7 is a flow diagram of a process 700 for implementing soft throttling, consistent with various embodiments. The process 700 may be executed in the environment 100 of FIG. 1. The process 700 begins at block 705, and at block 710, the throttling limit setting component 215 sets throttling limits for a specified shard hosted at the host server 110 for various resources, e.g., as described at least with reference to FIG. 3.

At block 715, the data management component 205 receives constraints associated with the host server 110, e.g., as described at least with reference to FIG. 6.

At block 720, the throttling component 220 determines that executing one or more data access requests for the specified shard exceeds at least one of the throttling limits, e.g., as described at least with reference to FIG. 3.

At block 725, the notification component 225 notifies an entity associated with the specified shard or an application service corresponding to the specified shard, which issued the one or more data access requests. The notification can indicate that the resource utilization of the specified shard exceeds one or more throttling limits or is within a specified threshold from one or more throttling limits set for the specified shard.

At block 730, the throttling component 220 determines if the constraints of the host server 110 are breached by the resource utilization of the specified shard. If the constraints are not breached, the process 700 returns. On the other hand, responsive to a determination that executing one or more of the data access requests breaches/exceeds the constraints, at block 735, the throttling component 220 can throttle, e.g., reject or fail, one or more of the data access requests for the specified shard. The throttled data access requests are not transmitted to the host server 110.

Figure 8:
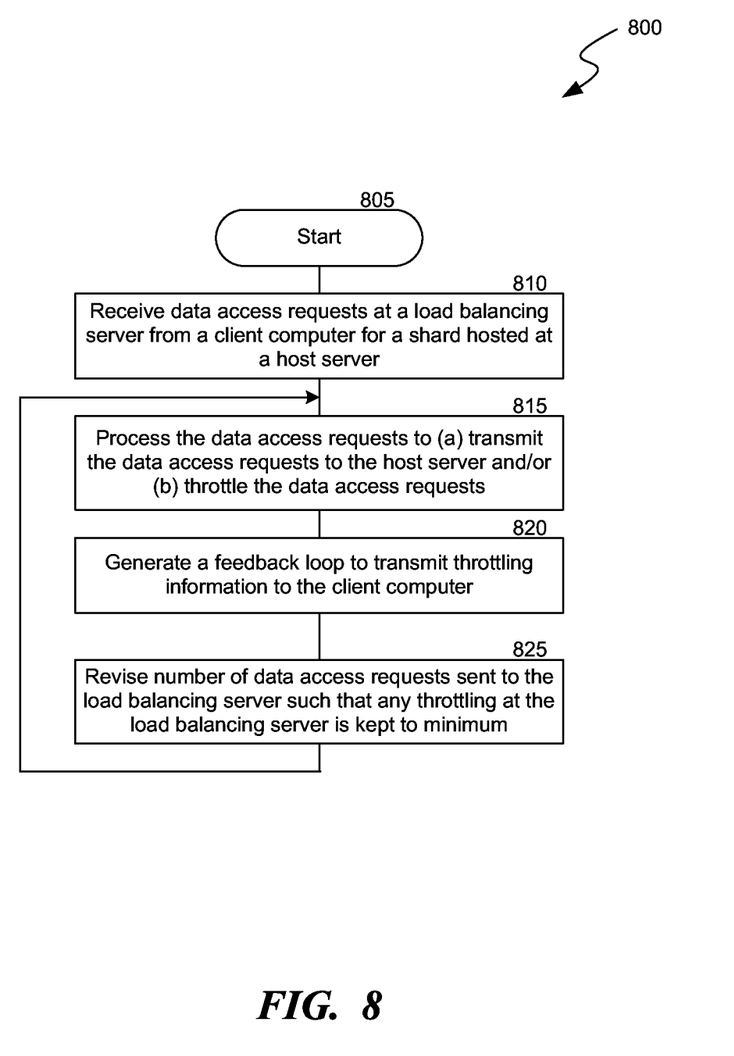
FIG. 8 is a flow diagram of a process for adjusting number data access requests for a shard to be sent to the host server, consistent with various embodiments.

FIG. 8 is a flow diagram of a process 800 for adjusting number data access requests for a shard to be sent to the host server, consistent with various embodiments. The process 800 may be executed in the environment 100 of FIG. 1. The process 800 begins at block 805, and at block 810, the data management component 205 receives data access requests for a specified shard hosted at the host server 110. The data access requests can be issued by an application service from a client computer 115 at which the application service is executing.

At block 815, the throttling component 220 processes the data access requests to transmit one or more of the data access requests to the host server and/or throttle one or more of the data access requests, e.g., as described at least with reference to FIG. 3.

At block 820, the throttling component 220 generates a feedback loop that feeds throttling information, e.g., throttling information 135, back to the client computer 115. The throttling information 135 can be indicative of at least one of whether a particular access request is throttled or not, how many access requests are throttled, or how many access requests are transmitted to the host server 110.

At block 825, the client computer 115 uses the throttling information 135 to adjust the number of access requests sent to the load balancing server 105 from an application service, such that the number of access requests throttled by the load balancing server 105 is reduced. For example, if the throttling information 135 indicates that 80% of the data access requests are being throttled (and therefore, 20% of them are allowed) by the load balancing server 105, then the client computer 115 adjusts the number of data access requests sent to the load balancing server 105 to be slightly above the percentage of requests which the load balancing server 105 is throttling. That is, continuing with the above example, if the load balancing server 105 is throttling at 20%, the client computer 115 will send slightly above 20%, e.g., 21% of data access requests to the load balancing server 105 and throttles 79% of the data access requests it receives from the application services locally, e.g., at the client computer 115. The values for "slightly above" can be user configurable. By throttling a majority of the data access requests at the client computer 115 itself the amount of requests on which the load balancing server 105 has to throttle is reduced, which results in a significant amount of computing resources of the load balancing server 105 being conserved. In some embodiments, the client computer 115 keeps the number of data access requests sent to the load balancing server 105 slightly above the throttling limits, e.g., 1% more than the throttling limit for the specified shard in order to keep the feedback loop active. As and when the number of throttling information changes, that is, the number of requests being throttled changes, the client computer 115 can adjust the number of requests to be sent to the load balancing server 105 accordingly. For example, if the throttling information 135 indicates that no requests are being throttled by the load balancing server 105, the client computer 115 can send more number of requests to the load balancing server 105 instead of throttling locally.

Figure 9:
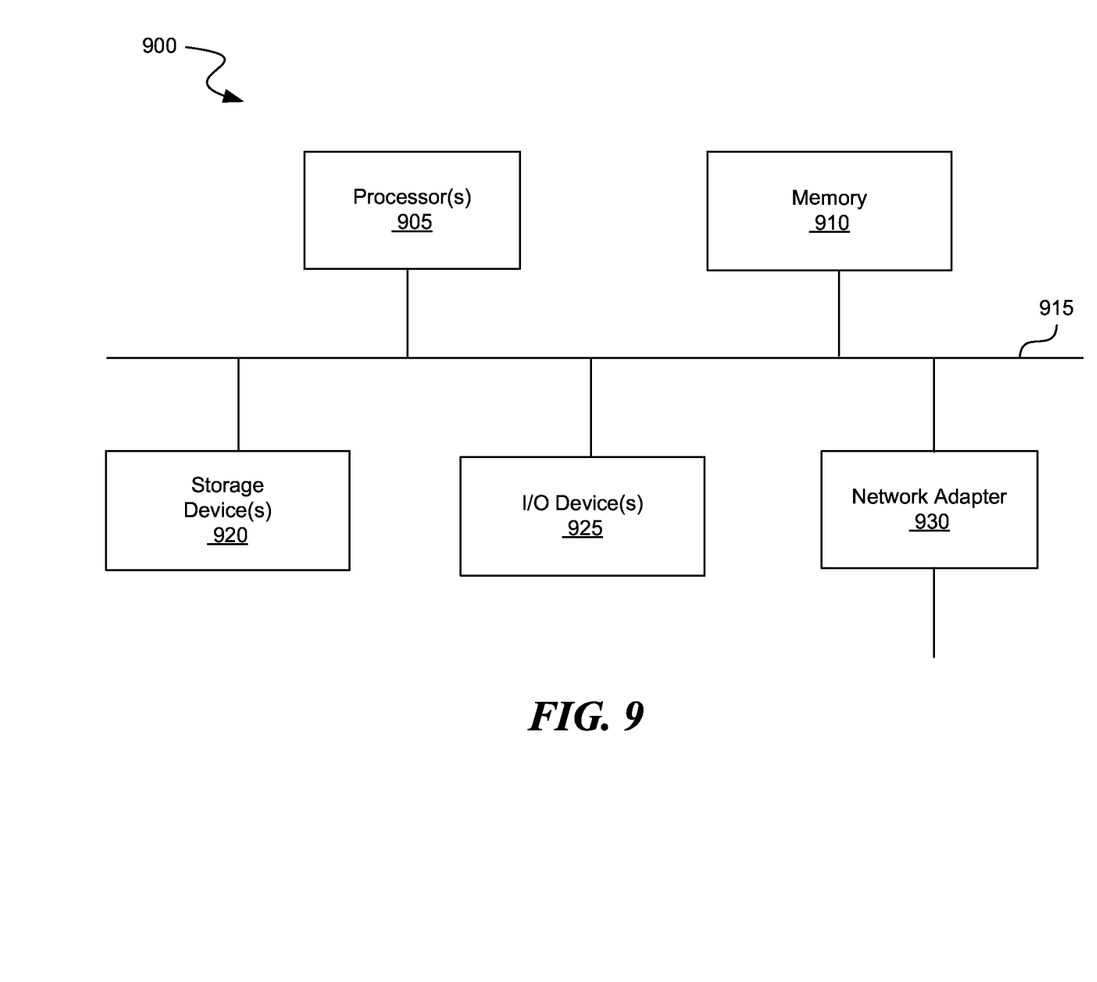
FIG. 9 is a block diagram of a computer system as may be used to implement features of the disclosed embodiments.

FIG. 9 is a block diagram of a computer system as may be used to implement features of the disclosed embodiments. The computing system 900 may be used to implement any of the entities, components, modules, systems, or services depicted in the examples of the foregoing figures (and any other entities described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    monitoring, at a server computer and for a specified period, resource utilization of a shard hosted at a host server computer, the shard storing data associated with an application service executing at a client computer, the resource utilization indicative of consumption of a specified resource associated with the host server computer;
    determining, at the server computer, an actual consumption of the specified resource by the shard based on the monitoring;
    determining, at the server computer and based on the actual consumption, a throttling limit for the shard for the specified resource, the throttling limit being a maximum amount of the specified resource that can be consumed by the shard;
    setting, at the server computer, the throttling limit for the specified resource for the shard by:
        receiving, at the server computer and from the application service, a resource utilization indicator of the shard, the resource utilization indicator indicative of an amount of the specified resource to be consumed by the shard;
        determining, at the server computer and based on the resource utilization indicator, an initial throttling limit for the specified resource; and
        adjusting, at the server computer, the initial throttling limit based on the actual consumption to generate the throttling limit; and
    rejecting, at the server computer, one or more access requests received from the application service for the shard in an event serving the one or more access requests causes the resource utilization to exceed the throttling limit.

2. The computer-implemented method of claim 1 further comprising:
    feeding, by the server computer, throttling information to the client computer, the throttling information indicative of a first number of access requests throttled by the server computer.

3. The computer-implemented method of claim 2 further comprising:
    sampling, by the client computer and based on the throttling information, multiple access requests to be sent to the server computer to reduce a number of access requests throttled by the server computer from the first number of access requests to a second number of access requests.

4. The computer-implemented method of claim 3, wherein the sampling includes:
throttling, by the client computer, a portion of the first number of access requests, wherein the portion is higher than the second number of access requests to be throttled by the server computer; and
sending, by the client computer, a total number of access requests not exceeding the throttling limit by the second number of access requests to the server computer.

5. The computer-implemented method of claim 1, wherein the shard is disposed within a plurality of shards.

6. The computer-implemented method of claim 1, wherein setting the throttling limit includes:
determining that the actual consumption has changed; and
adjusting the throttling limit based on the actual consumption that has changed to generate a revised throttling limit.

7. The computer-implemented method of claim 6, wherein determining that the actual consumption has changed is performed based on a trigger condition, the trigger condition including at least one of an expiry of a time interval, the actual consumption exceeding a specified threshold, or resource consumption of one or more resources at the host server computer falls out of a specified range.

8. The computer-implemented method of claim 1, wherein determining the throttling limit includes:
determining a value that is above the actual consumption by a specified percentage; and setting the value as the throttling limit.

9. The computer-implemented method of claim 1, wherein the specified resource is one of multiple resources associated with the host server computer and/or the shard, and wherein setting the throttling limit includes setting different throttling limits for different resources.

10. The computer-implemented method of claim 1, wherein the shard is one of multiple shards, and wherein setting the throttling limit for the specified resource includes setting different throttling limits for different shards.

11. The computer-implemented method of claim 1, wherein the actual consumption of the specified resource is determined as a maximum of the actual consumption over the specified period excluding any anomalies in the actual consumption.

12. The computer-implemented method of claim 1, wherein determining the actual consumption of the specified resource includes:
determining a maximum of the actual consumption in a portion of the specified period;
excluding any anomalies in the actual consumption in determining the maximum; and
extrapolating the maximum to a remaining of the specified period to determine the actual consumption.

13. The computer-implemented method of claim 1 further comprising:
sending a notification to an entity associated with the application service in an event the one or more access requests is rejected.

14. The computer-implemented method of claim 1 further comprising:
determining, at the server computer, a set of constraints for a set of resources associated with the host server computer, wherein the set of constraints is independent of the actual consumption of the set of resources by the application service; and
determining, at the server computer, a number of shards to be hosted by the host server computer based on the set of constraints.

15. The computer-implemented method of claim 14 further comprising:
receiving, at the server computer, multiple data access requests for the number of shards; and
forwarding, by the server computer, the multiple data access requests to the host server computer without throttling any of the multiple data access requests.

16. The computer-implemented method of claim 1 further comprising:
receiving a resource reservation requirement for the shard, the resource reservation requirement indicative of a minimum amount of the specified resource to be allocated for the shard; and
setting the throttling limit to be not less than the resource reservation requirement.

17. A non-transitory computer-readable storage medium storing computer-readable instructions that, when executed by a physical processor of a server computer, cause the server computer to perform a method comprising:
monitoring, for a specified period, resource utilization of a shard hosted at a host server computer, the shard storing data associated with an application service executing at a client computer, the resource utilization indicative of consumption of a specified resource associated with the host server computer;
determining an actual consumption of the specified resource by the shard based on the monitoring;
determining, based on the actual consumption, a throttling limit for the shard for the specified resource, the throttling limit being a maximum amount of the specified resource that can be consumed by the shard;
setting the throttling limit for the specified resource for the shard by:
receiving a resource utilization indicator of the shard, the resource utilization indicator indicative of an amount of the specified resource to be consumed by the shard;
determining, based on the resource utilization indicator, an initial throttling limit for the specified resource; and
adjusting the initial throttling limit based on the actual consumption to generate the throttling limit; and
rejecting one or more access requests received from the application service for the shard in an event serving the one or more access requests causes the resource utilization to exceed the throttling limit.

18. The non-transitory computer-readable storage medium of claim 17, wherein the instructions further cause the server computer to perform feeding throttling information to the client computer, the throttling information indicative of a first number of access requests throttled by the server computer.

19. The non-transitory computer-readable storage medium of claim 18, wherein the instructions further cause the client computer to perform sampling, based on the throttling information, multiple access requests to be sent to the server computer to reduce a number of access requests throttled by the server computer from the first number of access requests to a second number of access requests.

20. A system, comprising:
a physical computing processor of a server computer;

at least one physical memory storing computer-executable instructions that, when executed by the physical computing processor, cause the server computer to perform a method comprising:

monitoring, for a specified period, resource utilization of a shard hosted at a host server computer, the shard storing data associated with an application service executing at a client computer, the resource utilization indicative of consumption of a specified resource associated with the host server computer;

determining an actual consumption of the specified resource by the shard based on the monitoring;

determining, based on the actual consumption, a throttling limit for the shard for the specified resource, the throttling limit being a maximum amount of the specified resource that can be consumed by the shard;

setting the throttling limit for the specified resource for the shard by:
   receiving a resource utilization indicator of the shard, the resource utilization indicator indicative of an amount of the specified resource to be consumed by the shard;
   determining, based on the resource utilization indicator, an initial throttling limit for the specified resource; and
   adjusting the initial throttling limit based on the actual consumption to generate the throttling limit; and rejecting one or more access requests received from the application service for the shard in an event serving the one or more access requests causes the resource utilization to exceed the throttling limit.

\* \* \* \* \*